Jan. 10, 1967   R. M. PARKER   3,297,258
FOAM-GENERATING APPARATUS
Filed Dec. 14, 1964
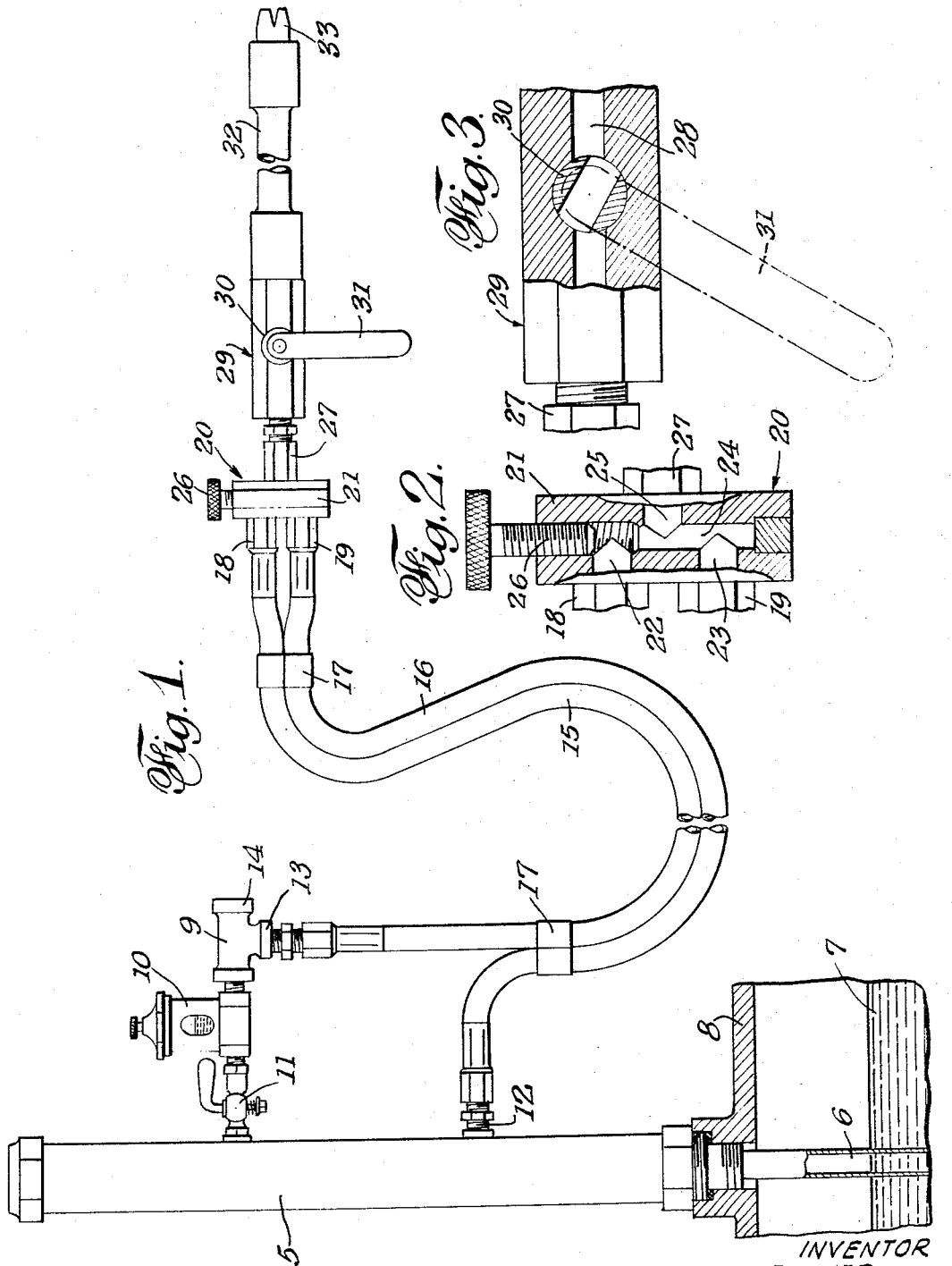
INVENTOR
ROY M. PARKER
BY C. E. Stratton
ATTORNEY

United States Patent Office 3,297,258
Patented Jan. 10, 1967

3,297,258
FOAM-GENERATING APPARATUS
Roy M. Parker, Brea, Calif., assignor to Cee-Bee Chemical Company, Inc., Downey, Calif., a corporation of California
Filed Dec. 14, 1964, Ser. No. 418,197
6 Claims. (Cl. 239—361)

This invention relates to apparatus for generating a saponaceous foam and is capable, also, of generating a spray of saponaceous or similar liquid.

An object of the present invention is to provide apparatus as above characterized that automatically balances liquid and air in a mixture thereof to obtain a consistency of foam, as desired.

Another object of the invention is to provide apparatus, as above referred to, that embodies a single adjustment for obtaining the desired balance of liquid soap and air, and the apparatus obtaining automatic balance of liquid and air by such single adjustment does not require regulation of the air intake line.

This invention also has for its objects to provide such means that are positive in operation, convenient in use, easily installed in a working position and easily disconnected therefrom, economical of manufacture, relatively simple, and of general superiority and serviceability.

The above objects are realized in apparatus that, by means of an air-operated reciprocating pump, creates a flow of saponaceous liquid through one hose while a flow of air, apportioned from the air inlet to the pump, is conducted through a companion hose to an adjustable mixer for both flows and wherein the air flow through the mixer has such an effect on the portion of inlet air that flows to the pump that it operates the latter progressively slower or faster according to the adjustment of air flow through the mix adjuster. The mixture exiting from the adjuster is passed through an elongated wand in which the air and liquid are so intermixed that the discharge is in the form of foam that is wet, medium or dry according to the proportion of air in the mixture. A shut-off valve may be incorporated between the mix adjuster and the wand.

The mixer is capable of being adjusted so that no air passes therethrough. Hence, all of the inlet air is fed to the pump which produces a flow of fluid, as before, said fluid reaching the wand without an admixture of air. A jet or nozzle provided on the discharge end of the wand produces a liquid spray rather than foam, as before.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a partly broken side elevational view of the present apparatus.

FIG. 2 is an enlarged longitudinal view of the mix adjuster.

FIG. 3 is a similar view of the shut-off valve.

The apparatus that is illustrated comprises an air-operated reciprocating pump 5 that has an inlet tube 6 extending into a saponaceous or solvent emulsion mixture fluid 7 in a tank or container 8. An air inlet fitting 9, through an oiler 10 and a flow control cock 11, provides compressed air to the pump 5 to cause reciprocation thereof and feed of the fluid 7 to the outlet 12 of said pump.

The fitting 9 is provided with a branch 13 that receives air from the inlet 14 and has a flexible hose 15 from a source of compressed air connected thereto. The outlet 12 has a similar hose 16 connected thereto, the two hoses 15 and 16 being connected by clips 17 to constitute a single, elongated and flexible unit that terminates in an air feed 18 and a liquid feed 19 which connect to a mix adjuster 20.

Said adjuster 20 comprises a body 21 with a port 22 receiving flow from the air feed 18 and a port 23 receiving flow from the fluid feed 19. Said ports 22 and 23 are connected by a passage 24 in the body, an oulet port 25 being connected to and receiving the flow in said passage. A valve screw 26 is adjustable in the body 21 to vary the flow size of the port 22 which, when the screw is tightened, is completely closed shutting off flow of air to the passage 24.

The port 25, through a connecting fitting 27, feeds a flow passage 28 in a flow valve 29, said passage 28 being intersected by a cock 30 controlled by a handle 31. This valve is merely a flow regulator of the amount of the mixture that is fed to a wand 32 which comprises an elongated tube through which the mixture moves and in which the air and fluid are so agitated as to create a foamy mass that exits from the end of the wand and is applied on surfaces to be cleaned or otherwise treated by said foam.

It will be clear that when the port 22 is closed, all of the air supplied to the inlet 14 of fitting 19 reaches the pump 5 which then carries out its function of providing a flow of fluid only from tank 7 through the end of the wand 32. A nozzle or jet fitting 33 may be provided on the wand end to break up the flow into a spray. Such flow is greater or smaller according to the setting of the cock 30 in valve 29.

When the valve screw 26 is eased off, opening the port 22, air from the inlet 14 will enter branch 13 of the fitting 9, and reach the passage 24 in a proportion to the total air supply according to the effective size of the throttled size of the port 22. As the port 22 is opened to rob the pump of operating air, as above described, the pump will slow down, accordingly. Such slower pump operation reduces the discharge flow of fluid in the hose 16.

It will be realized that when the effective size of the port 22 is smallest, the speed of reciprocation of the pump greatest, i.e., the rate of air flow to the mix adjuster is inverse to the lessening of fluid feed. Thus, the valve screw 26 may be set to obtain a desired balance of air and liquid by increasing the air while decreasing the fluid or, reversely, decreasing the air and increasing the fluid. The wet, medium or dry condition of the foam is retained according to the setting of the valve screw 26. No other adjustment is needed since the fitting automatically divides the air flow according to the valve adjustment.

The cock 11 may be adjusted to lessen the air flow to the pump.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. Foam-generating apparatus comprising:
 (a) a container for a solvent emulsion liquid,
 (b) a reciprocating pump to draw liquid from the container,
 (c) a fitting connected to a source of compressed air to operate the pump and having a branch through which air may be diverted from the flow thereof to the pump,
 (d) a mix adjuster having an open port to receive liquid under pressure of the pump and a second port to receive air diverted through said branch from the air flow to the pump, a passage in the adjuster being connected to both said ports and having an outlet port, and (e) means to adjust the second port to vary the air flow therethrough and, thereby, to correspondingly vary the flow of air to the pump, the pump speed varying according to the variation in the flow of air therethrough.

2. Foam-generating apparatus comprising:
(a) a container for a solvent emulsion liquid,
(b) a reciprocating pump to draw liquid from the container,
(c) a fitting connected to a source of compressed air to operate the pump and having a branch through which air may be diverted from the flow thereof to the pump,
(d) a mix adjuster having an open port to receive liquid under pressure of the pump and a second port to receive air diverted through said branch from the air flow to the pump, a passage in the adjuster being connected to both said ports and having an outlet port, and
(e) means to adjust the second port to vary the air flow therethrough and, thereby, to correspondingly increase the flow of air to the pump as air flow through said second port decreases, the pump speed increasing with increased air flow thereto and decreasing with decreased air flow thereto, the feed of liquid from the container to the open port being greatest when pump speed is greatest and least when pump speed is least.

3. Foam-generating apparatus according to claim 2 provided with flexible hose connections, one between the pump outlet and the open port, and the other between the fitting branch and the second port, said two hoses being connected to form a single elongated and flexible air and liquid conducting unit.

4. Foam-generating apparatus according to claim 2 including
(a) a manual valve to control flow from the outlet port of the mix adjuster, and
(b) an air and fluid mixing wand in the form of an elongated tube and extending from the outlet of the valve to so mix the air and fluid therein to form a foamy liquid that discharges from the end of the wand.

5. Apparatus according to claim 4, said port-adjusting means being adjustable to close the second port, the pump-operating air comprising the entire flow from the compressed air source, the flow in the passage of the mixer comprising only the liquid output of the pump, and a nozzle at the outlet of the wand to convert said liquid into a spray.

6. Apparatus according to claim 5 in which a cock is interposed between the pump and the air-receiving fitting to control air flow to the pump.

References Cited by the Examiner

UNITED STATES PATENTS

| | | | |
|---|---|---|---|
| 609,067 | 8/1898 | Woltz | 239—329 |
| 2,323,618 | 7/1943 | Ottoson | 239—346 |
| 2,599,678 | 6/1952 | Walker | 239—366 |

FOREIGN PATENTS 368,067   3/1932   Great Britain.

M. HENSON WOOD, JR., *Primary Examiner.*

R. S. STROBEL, *Assistant Examiner.*